United States Patent
Fukuda (10) Patent No.: US 6,441,849 B1
(45) Date of Patent: Aug. 27, 2002

(54) IMAGE PICKUP SYSTEM FOR OBTAINING AN IMAGE SIGNAL AT A PROPER LEVEL WITH HIGH DEFINITION FROM AN ARBITRARY SMALL AREA SELECTED FROM ALL IMAGE PICKUP AREAS

(75) Inventor: Hidetoshi Fukuda, Yokohama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/050,382

(22) Filed: Mar. 30, 1998

(30) Foreign Application Priority Data

Apr. 8, 1997 (JP) ............................................. 9-089362

(51) Int. Cl.$^7$ ........................... H04N 3/14; H04N 5/235
(52) U.S. Cl. ........................ 348/230; 348/280; 348/296; 348/298; 348/315
(58) Field of Search ................................ 348/207, 222, 348/229, 230, 240, 294, 296, 297, 298, 266, 272, 273, 280, 282, 302–304, 307–310, 311, 312, 315, 345, 350; G03B 13/00; H04N 3/14, 5/235

(56) References Cited

U.S. PATENT DOCUMENTS

| 4,339,775 A | * | 7/1982 | Lemke | 386/81 |
| 4,791,308 A | * | 12/1988 | Nagashima | 348/240 |
| 4,858,020 A | * | 8/1989 | Homma | 358/451 |
| 5,027,217 A | * | 6/1991 | Oshio | 348/297 |
| 5,412,422 A | * | 5/1995 | Yamada | 348/304 |
| 5,452,004 A | * | 9/1995 | Roberts | 348/301 |
| 5,668,597 A | * | 9/1997 | Parulski | 348/350 |
| 5,929,910 A | * | 7/1999 | Kim | 348/222 |

FOREIGN PATENT DOCUMENTS

| JP | 56-102172 | 8/1981 | ............ H04N/5/30 |
| JP | 9-163208 | 6/1997 | .......... H04N/5/225 |

* cited by examiner

Primary Examiner—Ngoc-Yen Vu
(74) Attorney, Agent, or Firm—Frishauf, Holtz, Goodman & Chick, P.C.

(57) ABSTRACT

A photographing lens focuses and forms incident light from a photographed body as an image on an image pickup face. An image pickup element photoelectrically converts the incident light focused and formed as an image by the photographing lens and converts the incident light to an image signal. A first control section obtains a first image signal by reading the image signal from each of pixels of a first area in all image pickup areas of the image pickup element. A second control section obtains a second image signal by reading the image signal from each of pixels of a second area smaller than the first area in all the image pickup areas of the image pickup element. A display section displays the first image signal obtained by the first control section. A third control section controls a level of the first image signal obtained by the first control section and a level of the second image signal obtained by the second control section such that these levels are substantially equal to each other.

8 Claims, 4 Drawing Sheets

IMAGE PICKUP SYSTEM FOR OBTAINING AN IMAGE SIGNAL AT A PROPER LEVEL WITH HIGH DEFINITION FROM AN ARBITRARY SMALL AREA SELECTED FROM ALL IMAGE PICKUP AREAS

BACKGROUND OF THE INVENTION

The present invention relates to an image pickup system and particularly relates to an image pickup system for reading an image signal from an arbitrary area of all image pickup areas of a photographed body.

A solid-state image pickup device described in Jpn. Pat. Appln. KOKAI Publication No. 56-102172 is conventionally known as the image pickup system of this kind.

Namely, the solid-state image pickup device described in JPN. Pat. Appln. KOKAI Publication No. 56-102172 partially scans an individual pixel constituting a solid-state image pickup element, and reads only an image signal of each pixel in a small area required in all image pickup areas of the solid-state image pickup element, without any blanking period so that only the image signal in the small area is read continuously and repeatedly.

In the conventional example, the image pickup device of a so-called X-Y address system reads a signal generated in each pixel while it sequentially scans the individual pixel constituting the image pickup element. In the image pickup device, a time from reading of the image signal of a certain pixel to the next reading of the image signal of the pixel becomes a substantial signal accumulating time. Thus, a level of the image signal read from each pixel of the image pickup element is determined.

Accordingly, when only the image signal of each pixel in the required small area in all the image pickup areas is read repeatedly and continuously, the number of read pixels is small in comparison with a case in which the image signal of each pixel is read from all the image pickup areas. Accordingly, the signal accumulating time is shortened. The image signal at a proper level is obtained when the image signal is read from all the image pickup areas. However, a problem exists in that no image signal at the proper level is obtained from the small area. However, this problem is not considered in the conventional solid-state image pickup device.

BRIEF SUMMARY OF THE INVENTION

In consideration of the problem, an object of the invention is to provide an image pickup system in which an image signal at a proper level with high definition can be also simply obtained from an arbitrary small area selected from all image pickup areas.

To achieve the object, a first aspect of the invention provides an image pickup system comprising a photographing lens for focusing and forming incident light from a photographed body as an image on an image pickup face; an image pickup element for photoelectrically converting the incident light focused and formed as an image by the photographing lens and converting the incident light to an image signal; first control means for obtaining a first image signal by reading the image signal from each of pixels of a first area in all image pickup areas of the image pickup element; second control means for obtaining a second image signal by reading the image signal from each of pixels of a second area smaller than the first area in all the image pickup areas of the image pickup element; display means for displaying the first image signal obtained by the first control means; and third control means for controlling a level of the first image signal obtained by the first control means and a level of the second image signal obtained by the second control means such that these levels are substantially equal to each other.

Furthermore, the third control means for controlling the levels of the first and second image signals to be substantially equal to each other includes a digital processing means or an analog processing means as described later on.

A second aspect of the invention provides an image pickup system comprising a photographing lens for focusing and forming incident light from a photographed body as an image on an image pickup face; an image pickup element for photoelectrically converting the incident light focused and formed as an image by the photographing lens and converting the incident light to an image signal; first control means for obtaining a first image signal by reading the image signal from each of pixels of a first area in all image pickup areas of the image pickup element; second control means for obtaining a second image signal by reading the image signal from each of pixels of a second area smaller than the first area in all the image pickup areas of the image pickup element; display means for displaying the first image signal obtained by the first control means; and third control means for controlling the total number of pixels as reading objects in the first area in all the image pickup areas of the image pickup element and the total number of pixels as reading objects in the second area such that these total numbers are substantially equal to each other.

A third aspect of the invention provides an image pickup system comprising a photographing lens for focusing and forming incident light from a photographed body as an image on an image pickup face; an image pickup element for photoelectrically converting the incident light focused and formed as an image by the photographing lens and converting the incident light to an image signal; first control means for obtaining a first image signal by reading the image signal from each of pixels of a first area in all image pickup areas of the image pickup element; second control means for obtaining a second image signal by reading the image signal from each of pixels of a second area smaller than the first area in all the image pickup areas of the image pickup element; display means for displaying the first image signal obtained by the first control means; and gain adjusting means for adjusting a gain of the image signal read from the second area in accordance with a ratio of the total number of pixels as reading objects in the first area in all the image pickup areas of the image pickup element and the total number of pixels as reading objects in the second area.

Namely, the second aspect of the invention. provides the image pickup system having the third control means for setting the total number of pixels as reading objects in the first area and the total number of pixels as reading objects in the second area such that these total numbers are substantially equal to each other. This third control means in the second aspect is provided as a concrete means of the third control means for setting the levels of the first and second image signals to be substantially equal to each other in the first aspect of the invention.

Further, the third aspect of the invention provides the image pickup system having the gain adjusting means for adjusting a gain of the image signal read from the second area in accordance with a ratio of the total number of pixels as reading objects in the first area and the total number of pixels as reading objects in the second area. The gain adjusting means in the third aspect of the invention is provided as a concrete means of the third control means for setting the levels of the first and second image signals to be substantially equal to each other in the first aspect of the invention.

A fourth aspect of the invention provides the image signal is read from the first area by thinning-out the image signal, and the image signal is sequentially read from the second area without thinning-out the image signal. The fourth aspect of the invention is provided as a concrete means of the first and second control means in the first to third aspects of the invention.

Further, according to a fifth aspects of the invention, image signals of predetermined plural pixels from respective areas partitioned at predetermined intervals in horizontal and vertical directions in the first area are added and read. The fifth aspects of the invention is provided as a concrete means of the first control means in the first to third inventions.

In the explanation, the first area includes a case in which the first area is all image pickup areas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

The embodiment modes of the invention will next be described with reference to the drawings.

Figure 1:
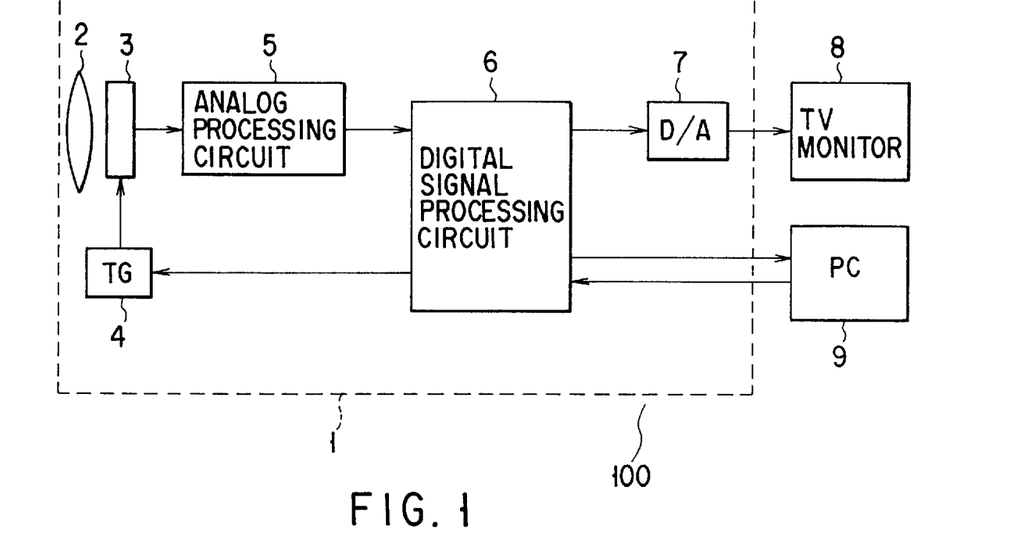
FIG. 1 is a block diagram showing the construction of an entire image pickup system for explaining a first embodiment mode of the invention.

FIG. 1 is a block diagram showing an image pickup device 1 constituting an image pickup system 100 in accordance with a first embodiment mode of the invention and connection of the image pickup device 1 with peripheral devices.

As shown in FIG. 1, the image pickup system 100 is constructed by the image pickup device 1 for picking-up the image of a photographed body and outputting an image signal, a TV monitor 8 for receiving the image signal and displaying the picked-up image, and a personal computer (hereinafter, called "PC") 9 for controlling an operation of the image pickup device 1 in accordance with various kinds of operations.

The construction of the image pickup system 100 will first be explained.

A photographing lens 2 focuses and forms the image of the photographed body as an image on an image pickup face of an image pickup element 3.

The image pickup element 3 can selectively read only an image signal of a pixel in an arbitrary area designated by an operator using an unillustrated mouse, etc. attached to the PC 9 from all image pickup areas on the image pickup face on the basis of a timing signal from a timing generating circuit 4 described later.

For example, such an image pickup element is constructed by a CMD (Charge Modulation Device) described in Jpn. Pat. Appln. KOKAI Publication No. 9-163208 filed by an assignee of the invention, etc.

The CMD is a solid-state image pickup element of an X-Y address type capable of reading a nondestructive signal.

Further, for example, the image pickup element 3 is an image pickup element of high pixels in which the number of pixels is 2048×2048.

An operation of the timing generating circuit (hereinafter, called "TG") 4 is controlled by a digital signal processing circuit 6 described later, and is a circuit for controlling driving timing of the image pickup element 3 and the position of a pixel as a reading object.

An output of the image pickup element 3 is supplied to an analog processing circuit 5.

The analog processing circuit 5 includes an unillustrated amplifying circuit for amplifying an analog output signal as an image signal of each pixel outputted from the image pickup element 3, and also includes an unillustrated A/D converting circuit for converting an output signal from the amplifying circuit to a digital signal.

The digital signal processing circuit 6 includes an unillustrated interface circuit for transmitting signals to a peripheral circuit and receiving signals from the peripheral circuit in accordance with various kinds of control signals from the PC 9. The digital signal processing circuit 6 is connected to the analog processing circuit 5, the TG 4, a D/A converting circuit 7 described later and the PC 9.

In the PC 9, the operator can perform various kinds of setting operations on an unillustrated monitor and give instructions by using the mouse or the like.

For example, the operator designates a position and a size of an area to be read from all the image pickup areas and changes these position and size.

The D/A converting circuit 7 connected to the digital signal processing circuit 6 is a circuit for converting a digital image signal processed by the digital signal processing circuit 6 to an analog image signal.

An output from the D/A converting circuit 7 is supplied to a TV monitor 8.

The TV monitor 8 is used to display the image of the photographed body received by the image pickup element 3.

If a standard image signal can be inputted to the PC 9, the TV monitor 8 can be omitted by using a monitor attached to the PC 9 instead of the TV monitor 8.

An operation of the image pickup system 100 in accordance with the first embodiment mode of the invention will next be explained.

Figure 2:
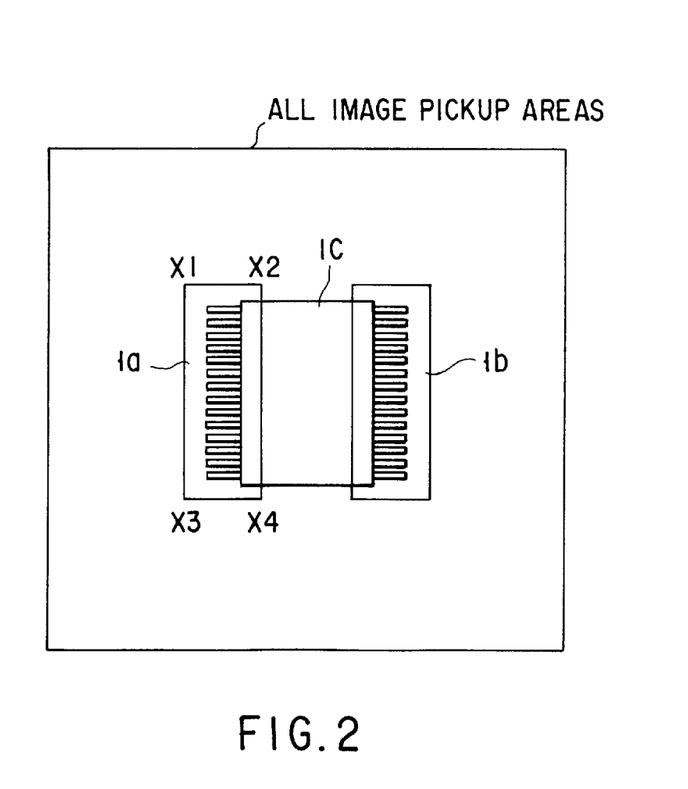
FIG. 2 is a view showing one example in which the external appearance of an integrated circuit (IC) as a photographed body is displayed in a TV monitor 8 of FIG. 1.

FIG. 2 shows an example in which the image of an entire external appearance of an integrated circuit (hereinafter, called an "IC") as a photographed body is picked up and is displayed in the TV monitor 8.

The image pickup element 1 is constructed by 2048×2048 pixels to obtain an image signal with high definition from an area smaller than all the image pickup areas.

However, many problems exist in that high speed signal processing, a TV monitor with high definition, etc. are required to display a moving image while image signals of all the pixels are read out.

Therefore, in this embodiment mode, an image signal of one pixel is extracted from all the image pickup areas in both horizontal and vertical directions of the pixels every four pixels. The image signal is read out repeatedly and continuously while the other image signals are thinned out (at this time, the total number of read pixels is about two hundred and fifty thousand). Thus, a standard image signal is obtained so that the moving image can be displayed in the normal TV monitor 8.

In contrast to this, for example, there is a case in which only an image signal of each of pixels in small areas 1a and 1b selectively designated by the PC 9 among all the image pickup areas as shown in FIG. 2 is read in uses such as an inspection, etc., and a predetermined inspection is performed.

In this case, no precise inspection is performed by the image signal read by the thinning-out since resolution is insufficient. Accordingly, it is desirable to read the image signal without thinning-out image signals.

However, with respect to the image signal read from the small area 1a or 1b, longitudinal and transversal pixel numbers are not in conformity with each other so that no image signal can be displayed in the TV monitor 8 as a standard image signal. Therefore, it is impossible to visually confirm whether the image signal read from the small area has a proper level.

Therefore, in this embodiment mode, a signal accumulating time obtained at a reading time of the image signal without thinning-out the image signals from the small area is set to be substantially equal to the signal accumulating time obtained at the reading time of the image signal by thinning-out the image signals from all the image pickup areas so that the image signal at a proper level is obtained.

These contents will next be further explained in detail.

As mentioned above, in this embodiment mode, the image signal is read out by repeatedly and continuously thinning-out the image signals from all the image pickup areas, and is thereby displayed in the TV monitor 8.

At this time, a time from the reading of the image signal of a certain pixel to re-reading of the image signal of this pixel is one period in which image signals are thinned out from all the image pickup areas and the image signal of one screen is read out. This one period becomes a substantial signal accumulating time so that a level of the image signal is determined.

Here, an image displayed by the-mentioned thinning-out can be observed by the TV monitor 8. Accordingly, for example, it is possible to judge whether the image signal level is proper or not while the light amount of an unillustrated light source and the aperture of an unillustrated diaphragm of the photographing lens 2 are adjusted and the TV monitor 8 is visually confirmed.

In contrast to this, only the image signal in the small area 1a or 1b in FIG. 2 is also read out repeatedly and continuously when the image signal in the small area is read without the thinning-out. Therefore, one reading period of all image signals in the small area becomes a signal accumulating time so that the image signal level is determined.

Accordingly, both the signal accumulating times are substantially equal to each other if the total number of pixels read at the reading time without the thinning-out is equal to the total number of pixels read at the reading time by the thinning-out. Therefore, the image signal levels are equal to each other. Thus, similar to the displayed image able to be visually confirmed on the TV monitor 8 from the small area 1a or 1b in FIG. 2, an image signal at a proper level with high definition is obtained.

FIGS. 3A to 3D are views for explaining that no signal accumulating time is changed if the total number of read pixels is the same even when pixel line numbers in an image pickup area as a reading object of the image signal of each of the pixels are different from each other.

For convenience of the explanation, the number of signal reading lines is set to four and eight (in reality, this number is greater than four and eight).

Further, the image pickup element is constructed by an image pickup element of a type in which signals are reset every time signals on one line are read.

Figure 3A:
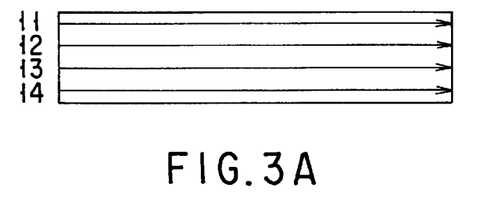
FIGS. 3A to 3D are views for explaining that a signal accumulating time is substantially the same if the total number of read pixels is the same even when line numbers in reading areas in all image pickup areas of an image pickup element are different from each other.
Figure 3B:
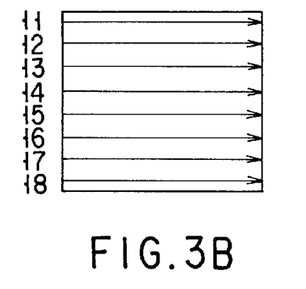

FIGS. 3A and 3B show image pickup elements in which signal reading lines are set to four and eight lines (the signal reading lines are sequentially set to 11, 12, 13, - - - from above) and pixel numbers are equal to each other.

Since the total number of read pixels is the same, the number of horizontal pixels at an eight-line is half the number of horizontal pixels at a four-line.

Figure 3C:
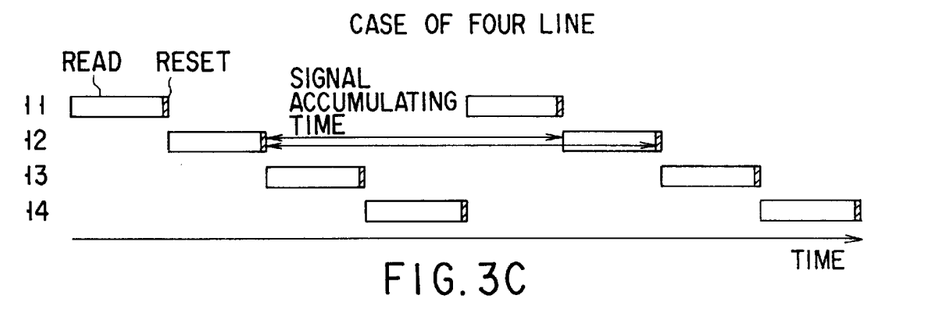
Figure 3D:
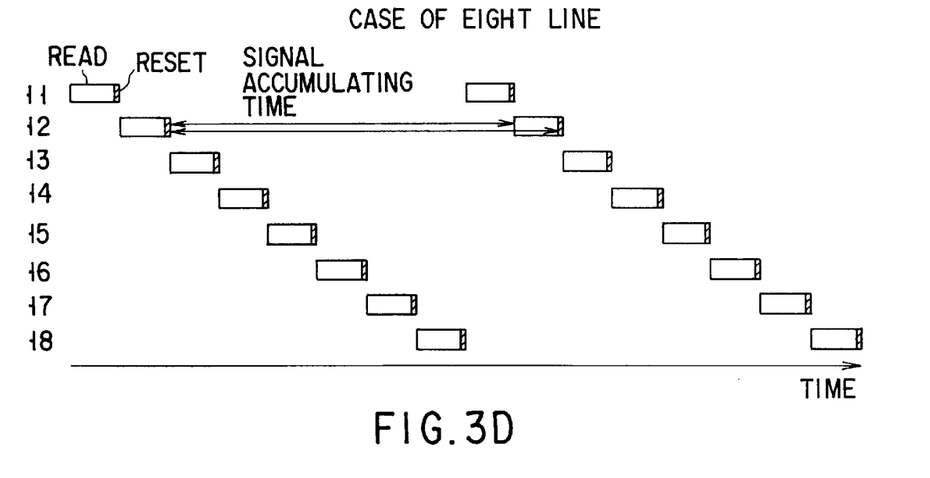

As shown in FIGS. 3C and 3D, if the total number of read pixels and a signal reading period every pixel are the same, a time from a resetting operation to the next reading operation of a signal, i.e., a signal accumulating time is substantially equal.

As mentioned above, signals are reset every time signals on one line are read out. Accordingly, as shown in FIGS. 3C and 3D, signal accumulating times at left-hand and right-hand ends of a line are different from each other by a signal reading time on one line. However, an entire signal accumulating time is a signal reading time with respect to the number of lines x one (a line number multiplied by one) line. Accordingly, in reality, this difference is small in comparison with the entire signal accumulating time so that no problem is caused.

Further, in reality, since there are horizontal and vertical blanking periods, the number of read pixels is determined in consideration of these blanking periods.

Figure 4:
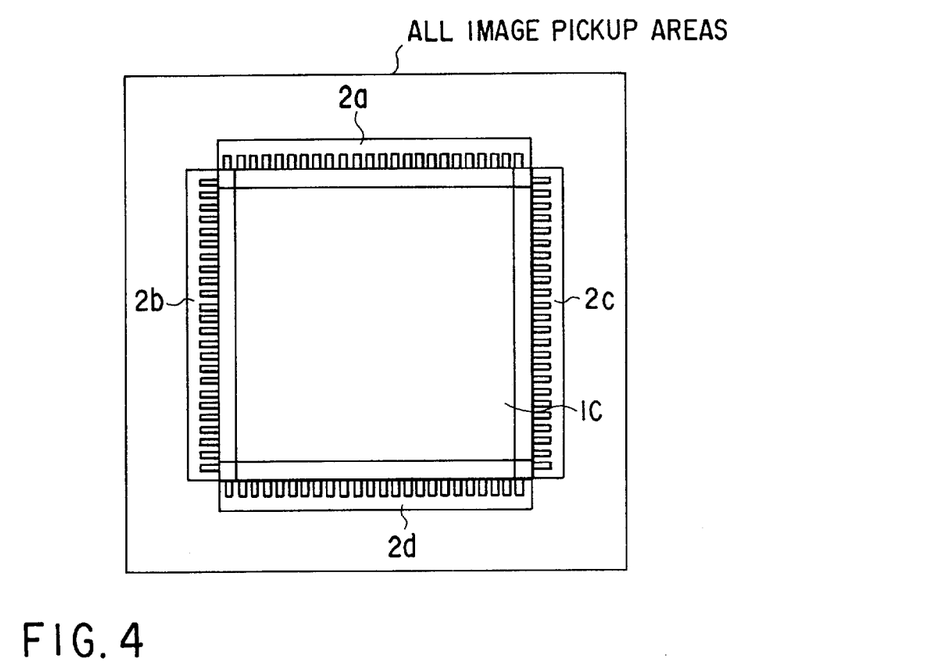
FIG. 4 is a view showing another example in which the external appearance of the integrated circuit (IC) as a photographed body is displayed in the TV monitor 8 of FIG. 1.

FIG. 4 shows an example in which the image of an IC different from that as a photographed body shown in FIG. 2 is picked up and is displayed in the TV monitor 8.

When the photographed body is changed, the position and size of an area according to the photographed body (areas 2a to 2d, etc. in FIG. 4) must be designated.

In this case, similar to the case, an image signal at a proper level is obtained if the shape and size of a picked-up rectangular area are designated by changing a longitudinal-transversal ratio and the image signal is read out while the total number of pixels in the picked-up rectangular area is constantly held.

In the explanation, for example, a concrete means for repeatedly and continuously reading the image signal in an arbitrary smaller area from all the image pickup areas is described in detail in the Jpn. Pat. Appln. KOKAI Publication No. 56-102172, and Jpn. Pat. Appln. KOKAI Publication No. 9-163208 filed by an assignee of the invention, etc.

In the invention, reading control of the image signal similar to that in the preceding art is performed by the PC 9, an unillustrated interface circuit built in the digital signal processing circuit 6, the timing generating circuit 4, the image pickup element 3, etc. in FIG. 1.

For example, when the positions of upper end faces X1, X2 of the rectangular area 1a shown in FIG. 2 are designated by using a mouse, etc. from the PC 9, the positions of lower end faces X3, X4 are automatically calculated such that the total number of pixels in the small area surrounded by the end faces X1 to X4 is equal to the total number of pixels read by thinning out these pixels from all image areas. Thus, a boundary of the small area 1a as a reading object is superimposed.

Simultaneously, a timing control signal for reading the image signal of the small area 1a set as above among all the image pickup areas of the image pickup element 3 is supplied from the PC 9 to the TG 4 through an unillustrated interface circuit built in the digital signal processing circuit 6.

Concrete control of the image pickup element 3, etc. using the TG 4 are described in Jpn. Pat. Appln. KOKAI Publication No. 9-163208, etc. filed by an assignee of the invention.

A method for setting the small area 1a, etc. is not limited to the example, but can be constructed by various kinds of methods in which one of longitudinal and transversal sizes is numerically inputted and the other is automatically set, etc.

In accordance with the first embodiment mode of the invention explained above, the total number of pixels as reading objects in a specific area as a displayed object to the TV monitor, etc. among all the image pickup areas of the image pickup element is set to be substantially equal to the total number of pixels as reading objects in an area smaller than this specific area. Accordingly, an image signal at a proper level with high definition can be also simply obtained from the designated small area.

An image pickup system 200 in accordance with a second embodiment mode of the invention will next be explained by using FIG. 5.

Figure 5:
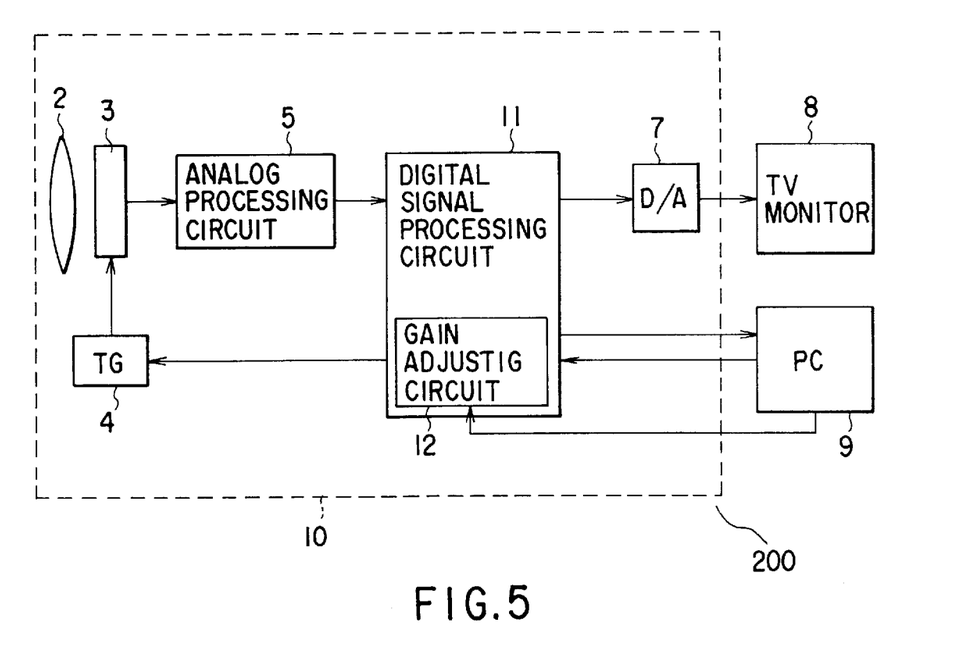
FIG. 5 is a block diagram showing the construction of an entire image pickup system for explaining a second embodiment mode of the invention.

In FIG. 5, the same circuits as FIG. 1 are designated by the same reference numerals.

The construction of the image pickup system in FIG. 5 will first be explained.

The explanation of an overlapping portion with the explanation of FIG. 1 is omitted in the following description.

In an image pickup device 10 constituting the image pickup system 200 in accordance with the second embodiment mode of the invention, the gain of an image signal read from an arbitrary small area designated by a mouse, etc. is adjusted in accordance with a ratio of the total number of pixels (e.g., the total number of pixels read by thinning-out image signals from all image pickup areas) as displayed objects to the TV monitor 8 and the total number of pixels read without thinning-out the image signals from the arbitrary small area so that an image signal at a proper level is obtained.

In FIG. 5, a signal supplied from a PC 9 to a gain adjusting circuit 812 built in a digital signal processing circuit 11 is a command signal for switching first and second operating modes. In the first operating mode, the total number of pixels as reading objects in an area as a displayed object to the TV monitor, etc. among all image pickup areas of an image pickup element as in the first embodiment mode is set to be substantially equal to the total number of pixels as reading objects in an area smaller than this area as a displayed object. In the second operating mode, the total number of pixels as reading objects in the small area is arbitrarily set.

The second operating mode is selected by operating the PC 9 by an operator. For example, when the total number of pixels in an area is set to two hundred thousand smaller than a total number of two hundred and fifty thousand pixels read by thinning-out image signals from all the image pickup areas, the level of an image signal read from each of the pixels is about 80 percent of a proper level.

The image signal level is amplified 1.25 times by the gain adjusting circuit 12 to correct the image signal level so that an image signal at the proper level is obtained.

Similarly, when the total number of pixels in the area is set to three hundred thousand, the level of an image signal read from each of the pixels approximately becomes 120 percent of the proper level. Accordingly, the image signal level is amplified 0.83 times by the gain adjusting circuit 12 to correct the image signal level so that an image signal at the proper level is obtained.

The first and second operating modes may be automatically selected in accordance with the size of an area designated by the operator of the PC 9, and may be also manually selected.

In the second embodiment mode of the invention explained above, in accordance with a ratio of the total number of pixels as reading objects among pixels arranged in a specific area as a displayed object to the TV monitor 8, etc. and the total number of pixels as reading objects in another selected arbitrary small area smaller than the specific area, the gain of an image signal read from the small area is adjusted so that an image signal at a proper level with high definition can be also simply obtained from the small area.

In particular, in accordance with the second embodiment form of the invention, there are effects in that the area of an arbitrary size can be selected without any restriction in the total number of read pixels.

In the first and second embodiment forms, the image signal is repeatedly and continuously thinned out from all the image pickup areas and is read and displayed in the TV monitor 8. However, there is also a case in which image signals obtained from a specific area smaller than all the image pickup areas are displayed in the TV monitor 8 and, similar to the case, an image signal of proper exposure with high definition among these image signals is read from an arbitrary small area.

In such a case, a signal obtained from the specific area smaller than all the image pickup areas may be set to correspond to a standard image signal and be displayed in the TV monitor 8.

Thus, since a photographed body can be enlargedly displayed, the image signal of proper exposure with high definition can be also obtained with respect to a further detailed portion.

The merit is particularly increased as the number of pixels in the image pickup element is increased.

In the first and second embodiment forms explained above, the total number of pixels as objects observed by the TV monitor 8, etc. in all the image pickup areas of the image pickup element is set to be equal to the total number of pixels in an arbitrary small area designated by a mouse, etc., and the gain of an image signal in the small area is adjusted such that the image signal at a proper level is also obtained from this small area. However, the invention is not limited to these embodiment forms. For example, a similar object can be achieved by adjusting a signal accumulating time by changing a scanning pulse period of TG4 determining a time from the reading of a certain pixel to the reading of the next continuous pixel when the image signal as an object observed by the TV monitor 8, etc. is read and the image signal in the small area is read.

In the explanation, when image signals are thinned out and read from the respective pixels of the image pickup element 3, the image signals of predetermined plural pixels may be added and read from respective areas divided at predetermined intervals in horizontal and vertical directions in all the image pickup areas.

A concrete example of the construction will next be explained by using FIGS. 6A and 6B.

Figure 6A:
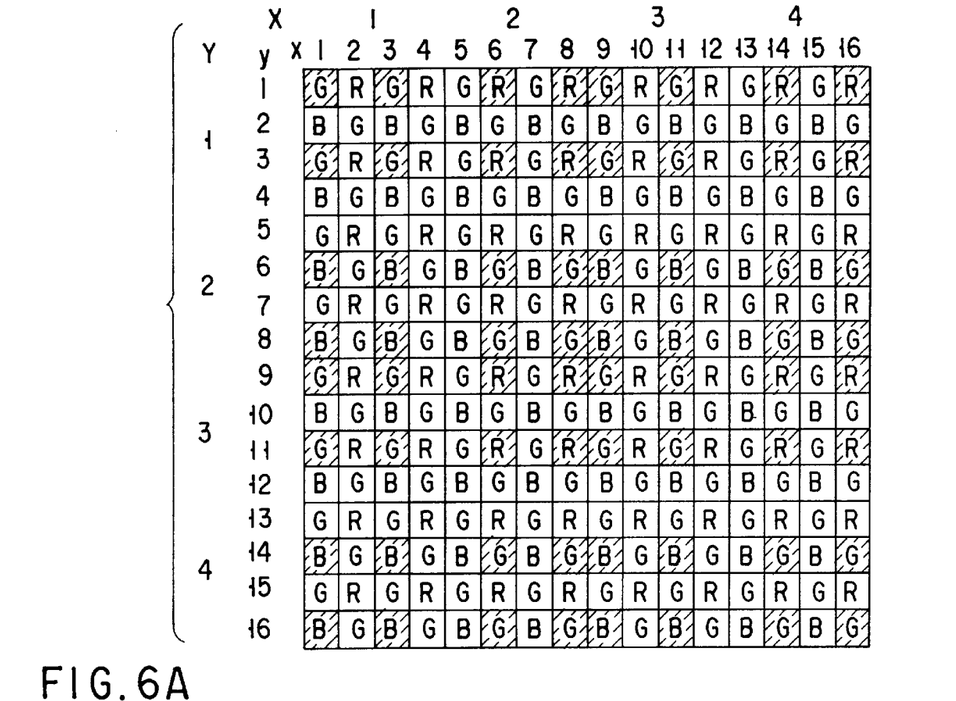
FIGS. 6A and 6B are views showing image pickup faces of the image pickup element in which red (R), green (G) and blue (B) color filters are arranged in each of pixels of the image pickup element.

FIG. 6A is a view showing an image pickup face of the image pickup element in which red (R), green (G) and blue (B) color filters are arranged in each of the pixels of the image pickup element.

For explanatory convenience, the number of pixels is set to 16×16, but is really larger than 16×16.

An arrangement of the color filters shown in FIG. 6A is a well-known Bayer arrangement.

As shown in FIG. 6A, a half of red, green and blue checkered patterns is set to green and halves of the remaining portion of the checkered patterns are equally divided by red and blue.

Four pixels are provided from the image pickup element arranging the color filters of such an arrangement on its front face in a horizontal (X) direction and four pixels are also provided from the image pickup element in a vertical (Y) direction. Sixteen pixels constructed by the horizontal four pixels and the vertical four pixels are set to a basic unit. Signals of four pixels of the same color designated from the basic unit are added to each other and are read.

Figure 6B:
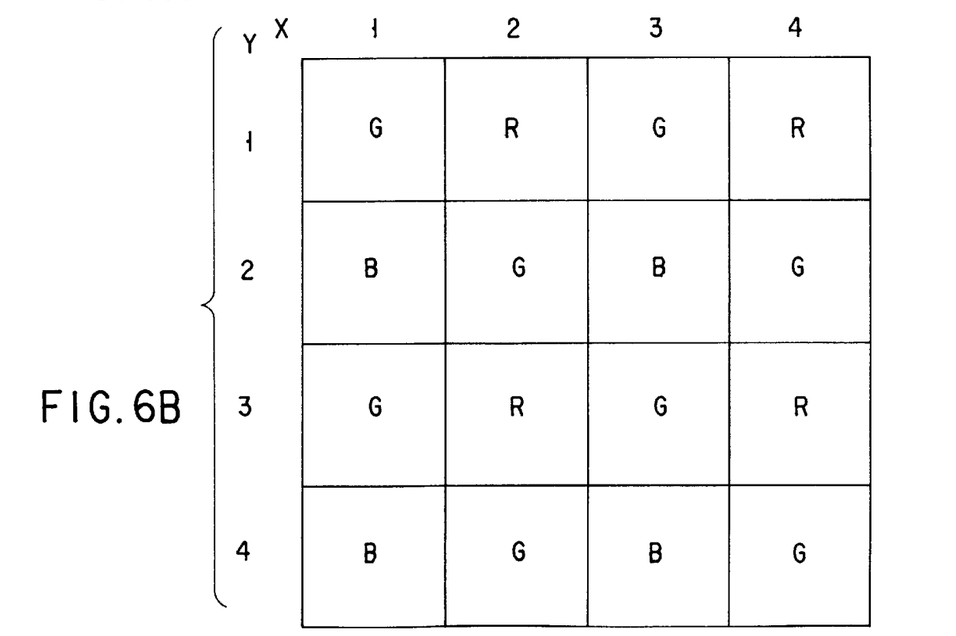

The output signals of the image pickup element read in this way are equivalent to output signals of the image pickup element having an arrangement of color filters shown in FIG. 6B.

The image signals are added to each other in real time in the image pickup element.

Thus, there are effects in that noises and returning distortion of the image signals are reduced in comparison with a case in which the image signals are simply thinned out and read.

As explained above, in accordance with the invention, it is possible to provide an image pickup system in which an image signal at a proper level with high definition can be simply obtained from an arbitrary small area in all the image pickup areas of the image pickup element.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An image pickup system comprising:

a photographing lens for focusing and forming incident light from a photographed body as an image on an image pickup face;

an image pickup element for photoelectrically converting the incident light focused and formed as an image by said photographing lens and converting the incident light to an image signal;

first control means for obtaining a first image signal by reading the image signal from each of pixels of a first area in all image pickup areas of said image pickup element;

second control means for obtaining a second image signal by reading the image signal from each of pixels of a second area smaller than said first area in all the image pickup areas of said image pickup element;

display means for displaying the first image signal obtained by said first control means; and gain adjusting means for adjusting a gain of the image signal read from said second area in accordance with a ratio of the total number of pixels as reading objects in the first area in all the image pickup areas of said image pickup element and the total number of pixels as reading objects in said second area.

2. The image pickup system as claimed in claim 1, wherein said first control means reads the image signal from said first area by thinning-out the image signal, and said second control means sequentially reads the image signal from said second area without thinning-out the image signal.

3. The image pickup system as claimed in claim 1, wherein said first control means adds image signals of predetermined plural pixels from respective areas partitioned at predetermined intervals in horizontal and vertical directions in said first area and reads these added image signals.

4. The image pickup system as claimed in claim 1, wherein said first control means sets a size of said first area to all image pickup areas of said image pickup element.

5. An image pickup system comprising:

a photographing lens which focuses and forms incident light from a photographed body as an image on an image pickup face;

an image pickup element which photoelectrically converts the incident light focused and formed as an image by said photographing lens and converts the incident light to an image signal;

a first controller which obtains a first image signal by reading the image signal from each of pixels of a first area in all image pickup areas of said image pickup element;

a second controller which obtains a second image signal by reading the image signal from each of pixels of a second area smaller than said first area in all the image pickup areas of said image pickup element;

a display which displays the first image signal obtained by said first controller; and a gain adjuster which adjusts a gain of the image signal read from said second area in accordance with a ratio of the total number of pixels as reading objects in the first area in all the image pickup areas of said image pickup element and the total number of pixels as reading objects in said second area.

6. The image pickup system as claimed in claim 5, wherein said first controller reads the image signal from said first area by thinning-out the image signal, and said second controller sequentially reads the image signal from said second area without thinning-out the image signal.

7. The image pickup system as claimed in claim 5, wherein said first controller adds image signals of predetermined plural pixels from respective areas partitioned at predetermined intervals in horizontal and vertical directions in said first area and reads these added image signals.

8. The image pickup system as claimed in claim 5, wherein said first controller sets said first area to all image pickup areas of said image pickup element.

* * * * *